United States Patent [19]
Nissen

[11] 4,057,356
[45] Nov. 8, 1977

[54] GLUED CORNER-JOINTS

[76] Inventor: Richard Bent Nissen, Langa, Denmark, 8870

[21] Appl. No.: 629,219

[22] Filed: Nov. 6, 1975

[30] Foreign Application Priority Data

Nov. 7, 1974 Denmark .............................. 5801/74
Apr. 21, 1975 Denmark .............................. 1700/75

[51] Int. Cl.² ........................................... F16B 12/46
[52] U.S. Cl. .................................. 403/219; 403/231; 403/382; 248/188
[58] Field of Search ............ 52/753 D, 753 T, 753 Y, 52/753 K; 403/382, 219, 231, 402, 364, 403; 248/188

[56] References Cited

U.S. PATENT DOCUMENTS

| 242,513 | 6/1881 | Crane | 403/382 |
|---|---|---|---|
| 288,126 | 11/1883 | Shearman | 248/188 |
| 480,536 | 8/1892 | Welker | 248/188 |
| 1,210,688 | 1/1917 | Peirce et al. | 52/753 Y |
| 2,077,067 | 4/1937 | McLellan et al. | 403/219 |

FOREIGN PATENT DOCUMENTS

| 121,471 | 3/1972 | Denmark | 403/219 |
|---|---|---|---|
| 627,397 | 3/1936 | Germany | 52/753 K |
| 35,656 | 8/1912 | Sweden | 248/188 |

*Primary Examiner*—Andrew V. Kundret
*Attorney, Agent, or Firm*—Finnegan, Henderson, Farabow & Garrett

[57] ABSTRACT

The corner-joint or the angular joint of oblong elements formed of a glueable material preferably wood is provided. A block is inserted in the corner and a joining surface of the block and the elements to be joined is provided with intermeshing tongues and grooves preferably of the finger-type form in their longitudinal direction a segment of a circle about an axis perpendicular to the plane of the joint elements. The matching fingers are glued together. The joint of this invention may be used for instance in a lattice girder and especially in frames for furniture. Further by a simple provision it will be possible to obtain a three-dimensional joint by adding a third element extending in the direction perpendicular to the plane of said two elements.

17 Claims, 6 Drawing Figures

GLUED CORNER-JOINTS

BACKGROUND OF THE INVENTION

1. Field of the invention

This invention relates to corner-joint in oblong elements formed of glueable material preferably of wood and with improved strength and which can be produced in a very simple way. This mode of joining the two elements forming the corner also makes it possible to obtain a three-dimensional joint by adding a third element.

2. Description of the prior art

To obtain a sufficient strength of a glued corner-joint it is well known in the art to provide the glued surface of the elements to be joined with tongues and grooves. It is also well known to insert a block in the corner, which, however, is glued to the elements by plane surfaces. Further the inventors Danish pat. No. 121 471 discloses a finger joint, where the fingers in their longitudinal direction form a segment of a circle in a plane, which coincides with the height of the fingers.

SUMMARY OF THE INVENTION

It is therefore an object of this invention to obtain a two-dimensional or three-dimensional glued corner-joint with improved strength and which may be simple and cheap to produce among others because of the possibility of using a standard size of the block which may be mass-produced, and without being necessary strictly to observe the angle of the corner. It will also be possible without special precaution to change within certain limits the angle of the corner-joint.

More especially, the invention relates to a cornerjoint where two elongated elements preferably formed of wood are mutually connected by a block preferably of wood inserted in the corner by providing the end faces of said block with tongues and grooves cut in planes parallel with a plane of the joint element and in the longitudinal direction forms a segment of a circle with a common centre and matching correspondingly concave tongues and grooves in adjacent surfaces of the two elements to be joined and whereby the three parts are glued together. By using tongues and grooves forming a segment of a circle the amount of material to be cut out from the elements is reduced to a minimum, whereby the strength of the joint is enhanced.

Preferably but not necessary also the ends of the two elements may be glued together by a mitred tongue and groove joint using common straight tongues and grooves or tongues and grooves forming a segment of a circle. In this case between the block and the end of the elements a triangular aperture may appear, which is surrounded by interconnected parts, so that a third elongated element may be inserted in this aperture and secured either by gluing or interference fit.

Under this condition, however, it is preferred that said third element or at least a tenon on the same to be inserted in the aperture, has circular cross-section. Thus according to a further embodiment of the invention this aperture may be bored out to at least a partially circular cross-section.

Further to ensure that said third element is secured by interference fit, the said bore may according to a further embodiment of the invention be slightly conical. It is to be understood, that this embodiment is specially applicable for furniture-frame having legs secured to its corners.

By a modification of the embodiment, where also the end of the elements are secured together with tongues and grooves in mitre, the said aperture may be avoided by using a block of half-circular or nearly half-circular configuration, where the tongues and grooves cover the circular side continuously from one end to the other. If in this embodiment also the tongues and grooves of the end of the element are forming a segment of a circle, it will not be necessary by assembling the corner to maintain the corner-angle exactly on the prescribed value, provided that firstly the two elements are assembled and after setting of the glue, the tongues and grooves in the elements to be connected with a block are then cut out with a cutter having a cutting-radius corresponding to the radius of the half-circular tongues and grooves in the block, which may then be inserted and glued in the corner.

DESCRIPTION OF PREFERRED EMBODIMENTS

Figure 1:
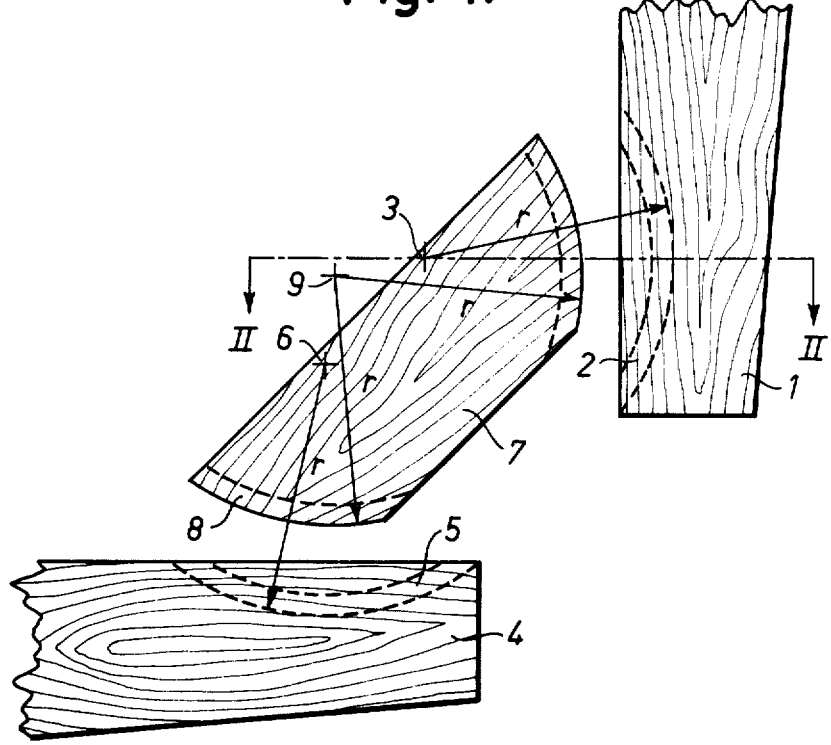
FIG. 1 is an exploded view of the two elements and a block to be assembled in a glued corner-joint.
Figure 2:
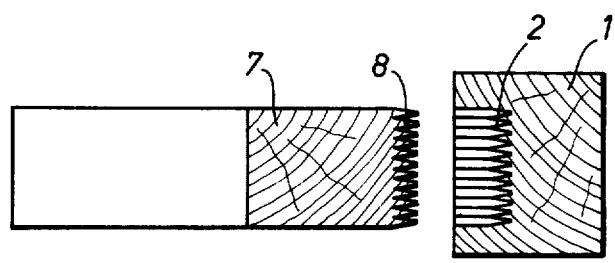
FIG. 2 is a cross-section taking along the line II—II of FIG. 1.
Figure 3:
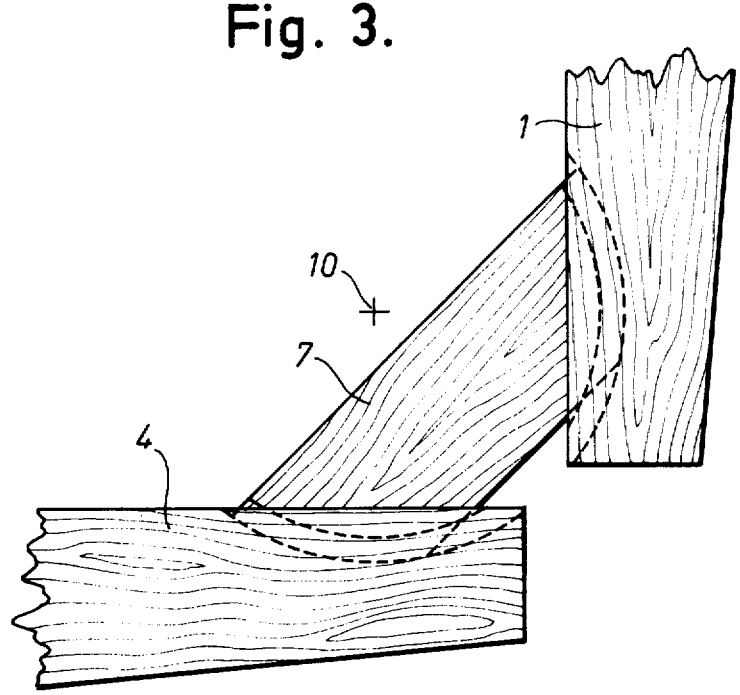
FIG. 3 the elements of FIG. 1 assembled in a corner-joint.

Referring now to FIG. 1–3, the glued corner-joint is shown wherein elements 1 and 4 to be joined are provided with tongues and grooves 2 and 5 respectively, which in their longitudinal direction forms a segment of a circle with a center 3 and 6 respectively. These tongues and grooves may be produced by advancing the element 1 against a cutterhead with a given diameter and provided with required number of cutter-blades, until the axis of the cutter has reached a point which in FIG. 1 is designated by 3.

In the same way the other element 4 is provided with tongues and grooves 5 forming a segment of a circle with a centre 6 and the same radius $r$ as the tongues and grooves cut out in the element 1.

In the event that the shown elements 1 and 4 constitute a part of a frame construction to be mass-produced, and thus also have to be provided with tongues and grooves at their end, this can be made by advancing the element against two cutters being positioned at a mutual distance according to the dimension of the frame.

A pre-fabricated block 7 provided at its both ends, and the adjacent parts of the one side with tongues and grooves 8, which in the longitudinal direction form a segment of a circle with a common centre 9 positioned adjacent to or some distance away from the other side-surface of the block. The radius $r$ being the same as that used for the tongues and grooves cut in the elements 1 and 4. The tongues and grooves 8 in the block 7 may for instance be produced by turning the block in relation to one or preferably two cutters placed at a desired distance from the point 9.

After applying glue to the tongues and grooves, the elements 1, 4 and block 7 are assembled by pressing the three members together as shown in FIG. 3.

Due to the ability of the tongues and grooves to keep the joint-members together, the pressure exerted on the members may be released after a short period, and it will be sufficient to leave the joint undisturbed until the glue has set.

It is to be understood, that it will be possible without special provisions within certain limits to produce this joint with different angles of the corner.

Figure 4:
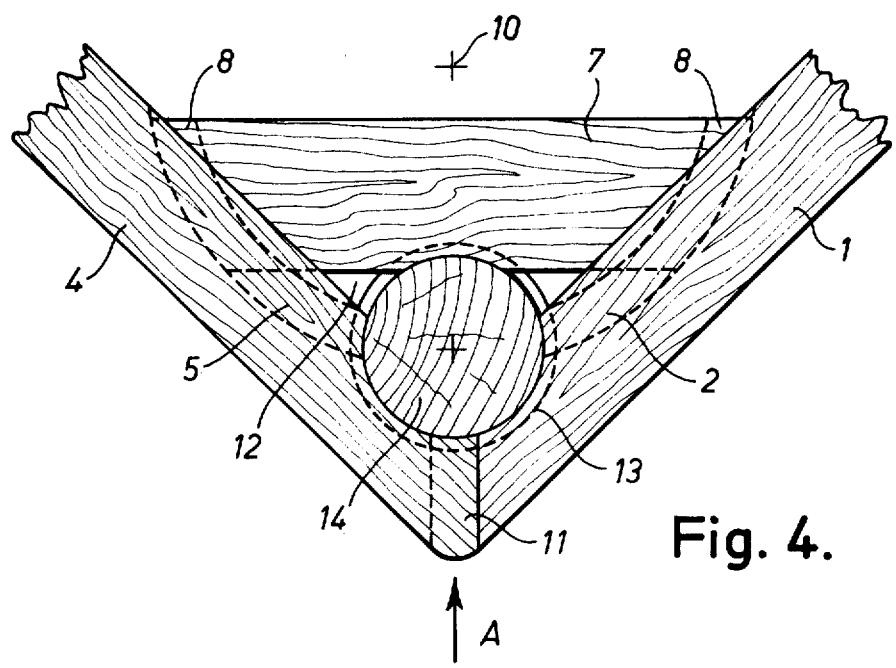
FIG. 4 another embodiment of the corner-joint where a third element is added to form a three-dimensional corner.
Figure 5:
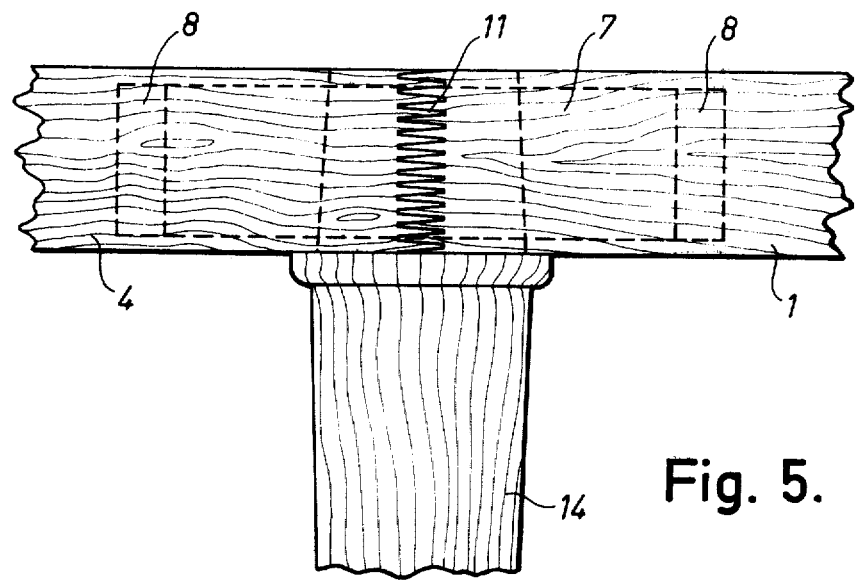
FIG. 5 the same as seen in the direction A of FIG. 4.
Figure 6:
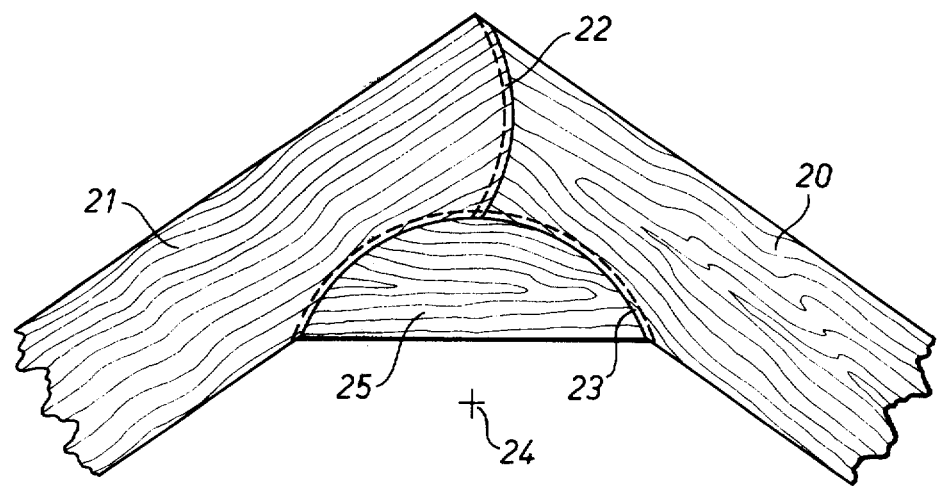
FIG. 6 a further embodiment of the corner-joint.

To further enhance the strength of the joint described above the ends of the elements 1 and 4 may be extended so as to enable them to be joined in mitre by means of further tongues and grooves, which may be of the common straight configuration as shown by 11 in FIG. 4 and 5, or forming a segment of a circle as shown in FIG. 6.

By the embodiment as shown in FIG. 4 between the block 7 and the two elements 1, 4 will appear a triangular aperture 12, which is totally surrounded by the mentioned three strongly interconnected parts, so that it will be possible to insert in this aperture a third oblong element substantially perpendicular to the plane of the elements 1, 4, and securing the same provided that its cross section substantially corresponds to that of the aperture 12.

However, to ensure, for example, an interference fit a circular cross section of the said third element is to be preferred. This may be achieved by at least partly boring out the aperture 12 after the assembling of the joint as shown in FIG. 4.

This embodiment will appear from FIG. 4 and 5 which by way of example shows a corner of a furniture frame with a leg secured thereto. By this embodiment the elements 1 and 4 are interconnected at their ends in mitre by means of straight grooves and tongues 11 and the aperture 12 between 1, 4 and 7 parts is partly enlarged by a bore 13.

The bore 13 is slightly conical so that a matching conical tenon on a furniture leg 14 can be inserted and secured by interference fit. To prevent the leg in working loose, it may be further attached for example by a snapping device of any kind, which is well known in the art and therefore not shown in the drawing.

In FIG. 6 an alternate embodiment of the invention is shown which may be applicable, where ultimate strength of the joint is required, as for example in a lattice-girder. By this embodiment the two elements 20 and 21 are connected and glued partly at their ends by means of tongues and grooves 22, which in their longitudinal direction form a segment of a circle partly by a block 25 of a nearly half circular configuration, the curved side of which is constituted by tongues and grooves with a centre of curvature 24 positioned at small distance outside the straight side of the block. The block 25 is so arranged in the corner that its tongues and grooves 23 are in mesh with corresponding tongues and grooves, which have been cut out in the elements 20, 21, and which as will appear from the drawing, are completely filled out with the tongues of the block 25, so that reduction of the cross sectional area of the elements will not occur at any point.

The three parts to be joined may be provided with the tongues and grooves 22 and 23 in advance, which implies that the angle of the corner is kept exactly at the assembling. This problem may be overcome in a simple way by first connecting the elements 20 and 21 by means of the curved tongues and grooves, where a strictly observation of the corner angle is not necessary, and then when the glue has set, by cutting out the tongues and grooves in the assembled elements 20 and 21 by means of a cutter-head, the dimension of which corresponds to that of the tongues and grooves in the block 25, and thereupon by inserting and glueing the block 21 in its proper position. This ensures that the tongues and grooves in the block 25 will match exactly into the corresponding tongues and grooves in the elements 20, 21.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What I claim is:

1. A corner joint comprising a pair of elongated, angularly related, elements arranged to form part of the corner joint, a block connecting said pair of elements along the inside of said corner joint and lying in a plane formed by said angularly related elements, the adjoining surfaces of the block and the respective elements each being provided with and interconnected by tongues and grooves, the tongues and grooves of each said surface having outer tips and bases respectively which lie coincident with segments of circles having a common axis perpendicular to the plane of the elements in the corner joint, each of the ends of said pair of elements in the corner joint carrying respective tongues and grooves, the tongues and grooves of said ends being interconnected to join said elements one to the other, said block being elongated and spaced from the joined ends of said elements.

2. A corner joint according to claim 1 wherein said elements and said block define an opening therebetween, a third elongated element disposed in said opening between the block and said pair of elements and extending substantially perpendicular to the plane of said pair of elements, and means for securing said third element to said pair of elements and said block.

3. A corner joint as defined in claim 2 wherein said third element has a tenon adjacent one end thereof, said pair of elements and said block being at least partly bored to define said opening for receiving said tenon.

4. A corner joint according to claim 3 wherein said bore is slightly conical in shape, said tenon being connected to said pair of elements and said block by an interference fit.

5. A corner joint comprising a pair of elongated, angularly related, elements arranged to form part of the corner joint, a block connecting said pair of elements along the inside of said corner joint and lying in a plane formed by said angularly related elements, the adjoining surfaces of the block and the respective elements each being provided with and interconnected by tongues and grooves, the tongues and grooves of each said surface having outer tips and bases respectively which lie coincident with segments of circles having a common axis perpendicular to the plane of the elements in the corner joint, the segments of the circles defined by the outer tips and bases of the tongues and grooves of the adjoining surface of one element having a common axis with the segments of the circles defined by the outer tips and bases of the tongues and grooves of the adjoining surface of the other of said elements.

6. A corner joint according to claim 5 including glue applied to the tongues and grooves of said adjoining surfaces whereby each of said pair of elements and said block are glued one to the other.

7. A corner joint according to claim 5 wherein each of said tongues has a base portion and side surfaces which converge toward one another in a direction from its base portion towards its outer tip, each of said grooves being defined by the opposed side surfaces of adjacent tongues and diverging outwardly from its base toward the outer tips of said adjacent tongues.

8. A corner joint according to claim 5 wherein the cross section of each tongue is substantially constant throughout its length as measured along the arcs of said circle segments.

9. A corner joint according to claim 5 wherein the outer tips of the tongues and the bases of the grooves carried by said pair of elements are concave, the outer tips of the tongues and the bases of the grooves carried by said block at its opposite ends being convex, the circle segments of the tongues and grooves formed at one end of said block and the tongues and grooves formed on the element adjoining said one block end having substantially common axes when said block and adjoining element are connected one to the other in said joint, the circle segments of the tongues and grooves formed at the opposite end of said block and the tongues and grooves formed on the other of said pair of elements and adjoining said opposite block end having substantially common axes when said block and said other adjoining element are connected one to the other in said joint.

10. A corner joint according to claim 9 wherein the tongues of each adjoining surface taper outwardly towards their outer tips and the grooves thereof taper inwardly towards their bases, the outer tips of the tongues and the bases of the grooves carried by said pair of elements being concave, the outer tips of the tongues and the bases of the grooves carried by said block being convex.

11. A corner joint according to claim 10 wherein the cross section of each tongue is substantially constant throughout its length as measured along the arcs of said circle segments.

12. A corner joint according to claim 5 wherein each of the ends of said pair of elements in the corner joint carry respective tongues and grooves, the tongues and grooves of said ends being interconnected to join said elements one to the other.

13. A corner joint according to claim 12 wherein said block is elongated and spaced from the joined ends of said elements.

14. A corner joint according to claim 5 wherein the tongues and the grooves of the respective adjoining surfaces of said block form a continuation each of the other with the segments of the circles defined by the outer tips and bases of the tongues and grooves of the block surface adjoining one element having a common axis with the segments of the circles defined by the outer tips and bases of the tongues and grooves of the block surface adjoining the other element.

15. A corner joint according to claim 13 including a fourth element in said joint, said fourth element having an end receivable within the space between said block and the joined ends of said elements, and means for securing said fourth element in said joint.

16. A corner joint according to claim 15 wherein the space between the elements and block defined by the inside faces of said elements and said block is bored, the end of said fourth element being generally circular in cross section and receivable within said bore.

17. A glued corner-joint joining the ends of two oblong elements
  said ends being joint in mitre by tongues and grooves, which in their longitudinal direction follow segment of a circle about an axis perpendicular to the plane of said elements,
  a block of nearly half-circular outline, inserted in the corner and joined to said elements by tongues and grooves. which in their longitudinal direction follow a segment of a circle about an axis perpendicular to the plane of the elements.

* * * * *